E. Jenney & D. Rood.
Mach. for Dressing & Jointing Staves.
Nº 9028. Patented Jun. 15. 1852.

Sheet 1. 4 Sheets.

E. Jenney & D. Rood.
Mach. for Dressing & Jointing Staves.
N° 9028. Patented Jun. 15, 1852.

E. Jenney & D. Rood.  Sheet 3. 4 Sheets.
Mach. for Dressing & Jointing Staves.
No. 9028.   Patented Jun. 15, 1852.
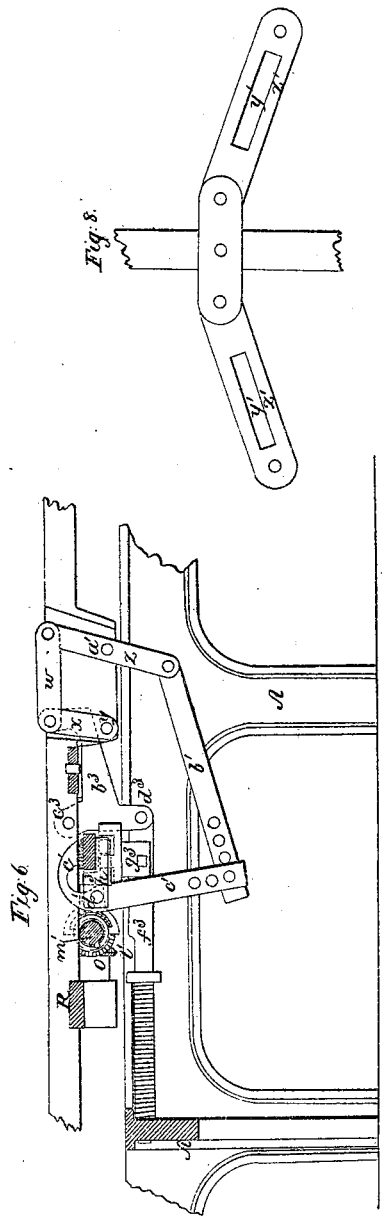
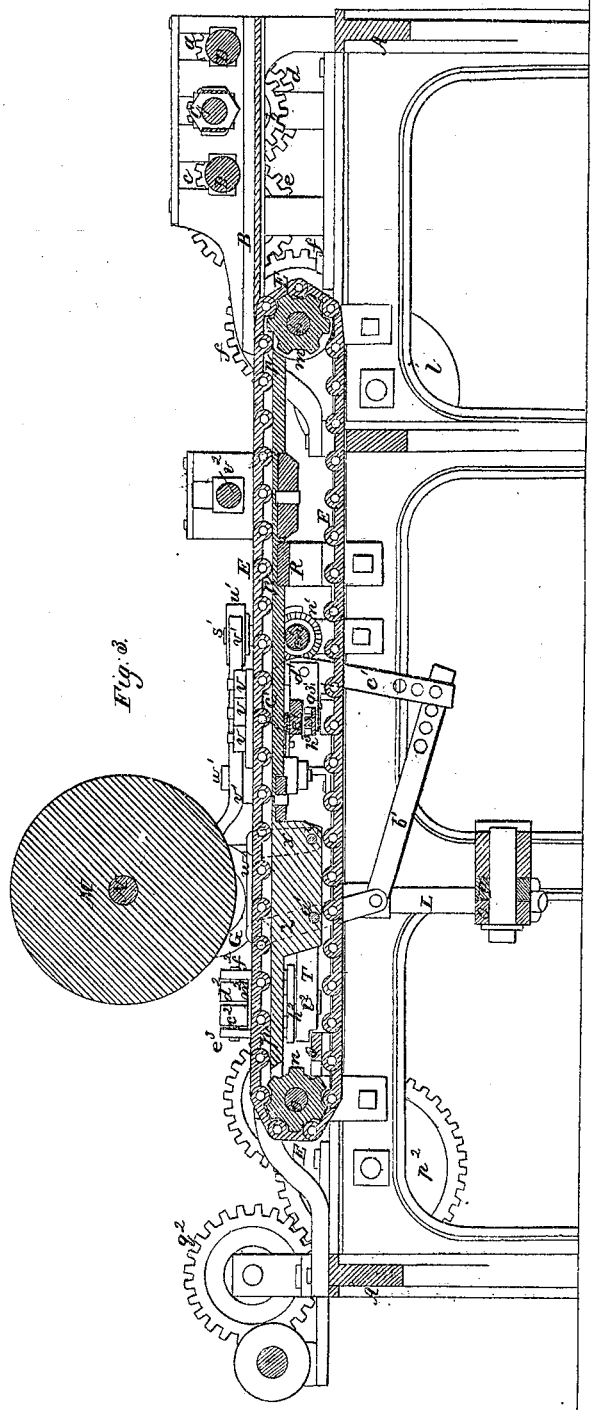

E. Jenney & D. Rood. Sheet 4. 4 Sheets
Mach. for Dressing & Jointing Staves.
N° 9028.                    Patented Jan. 15. 1852.

UNITED STATES PATENT OFFICE.

DAVID ROOD, OF EAST BOSTON, AND EDWIN JENNEY, OF MIDDLEBOROUGH, MASSACHUSETTS, ASSIGNORS TO E. JENNEY.

MACHINE FOR JOINTING STAVES.

Specification of Letters Patent No. 9,028, dated June 15, 1852.

*To all whom it may concern:*

Be it known that we, DAVID ROOD, late of New Bedford, but now of East Boston, in the county of Suffolk, and EDWIN JENNEY, of Middleborough, in the county of Bristol, State of Massachusetts, have invented a new and useful Machine for Dressing and Jointing Staves; and we do hereby declare that the same is fully described and represented in the following specification and the accompanying drawings, letters, figures, and references thereof.

Figure 4:
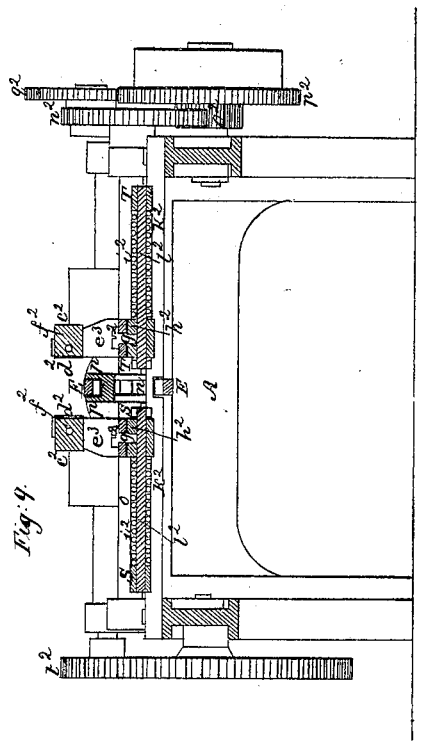
Figure 1:
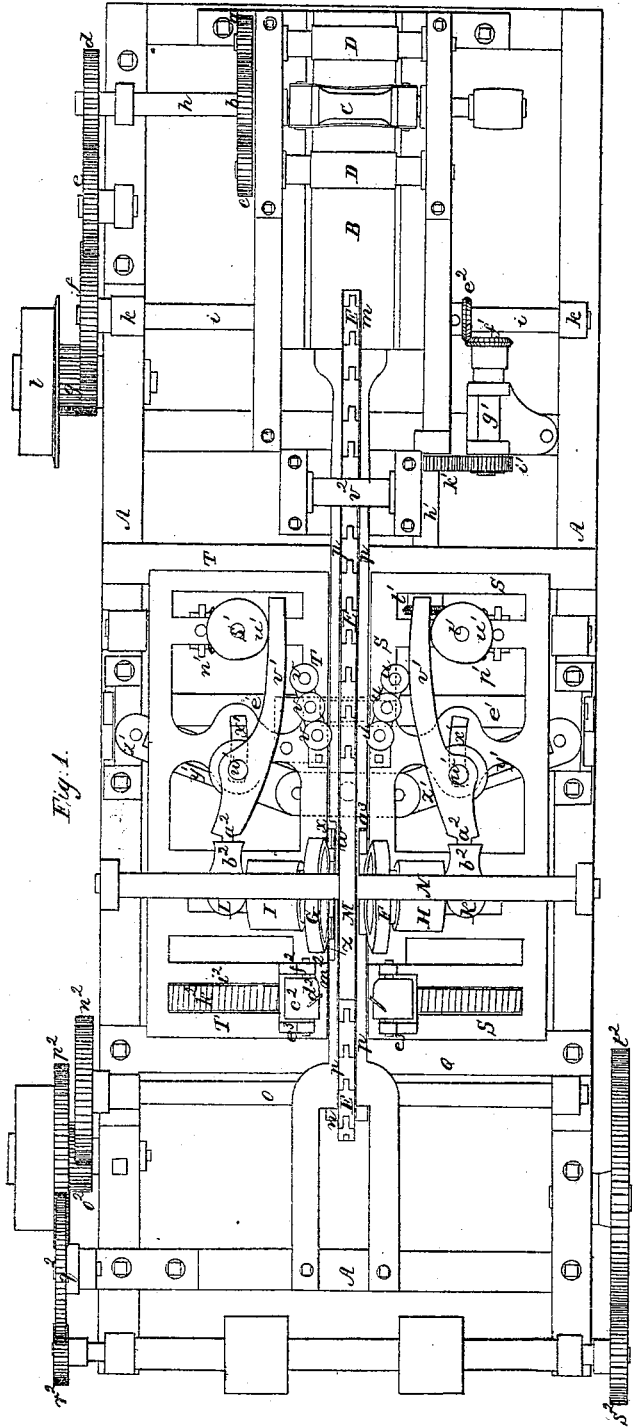
Figure 3:
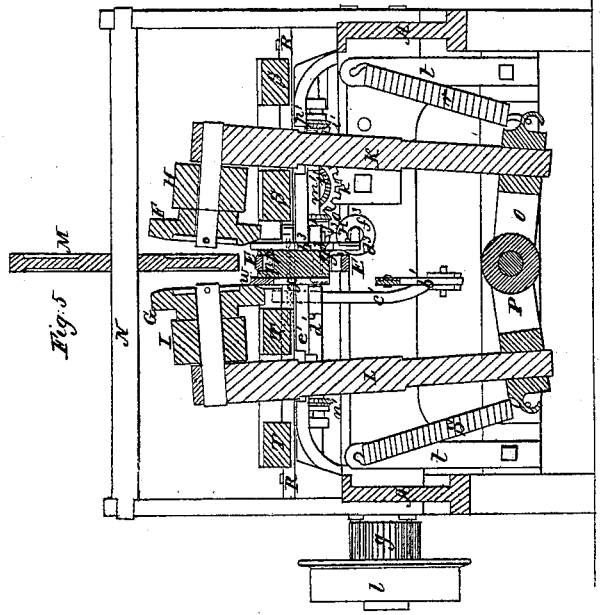
Figure 2:
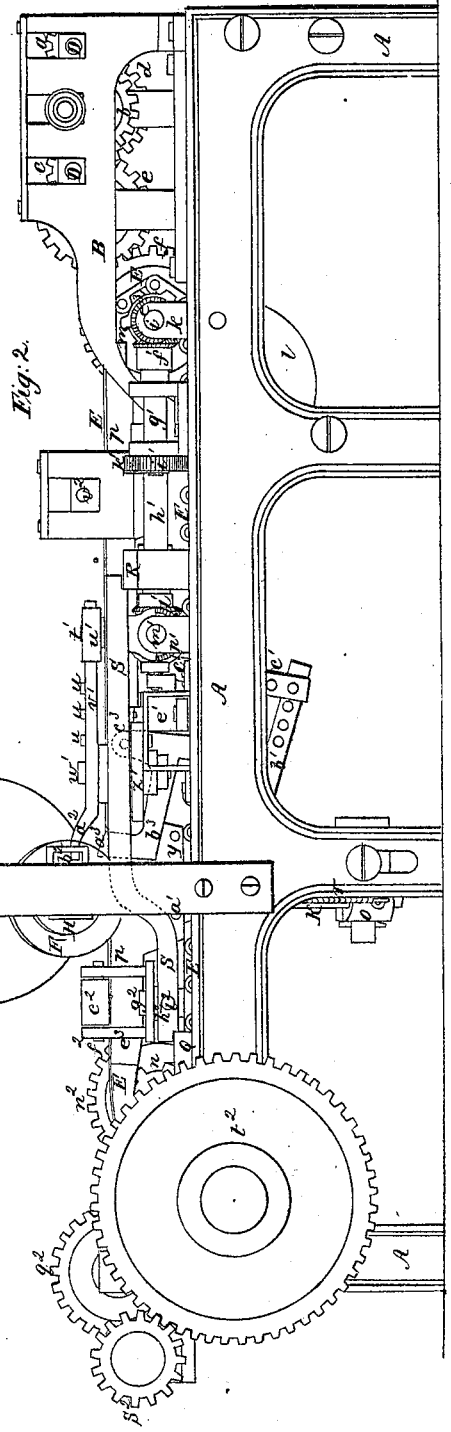
Figure 4:
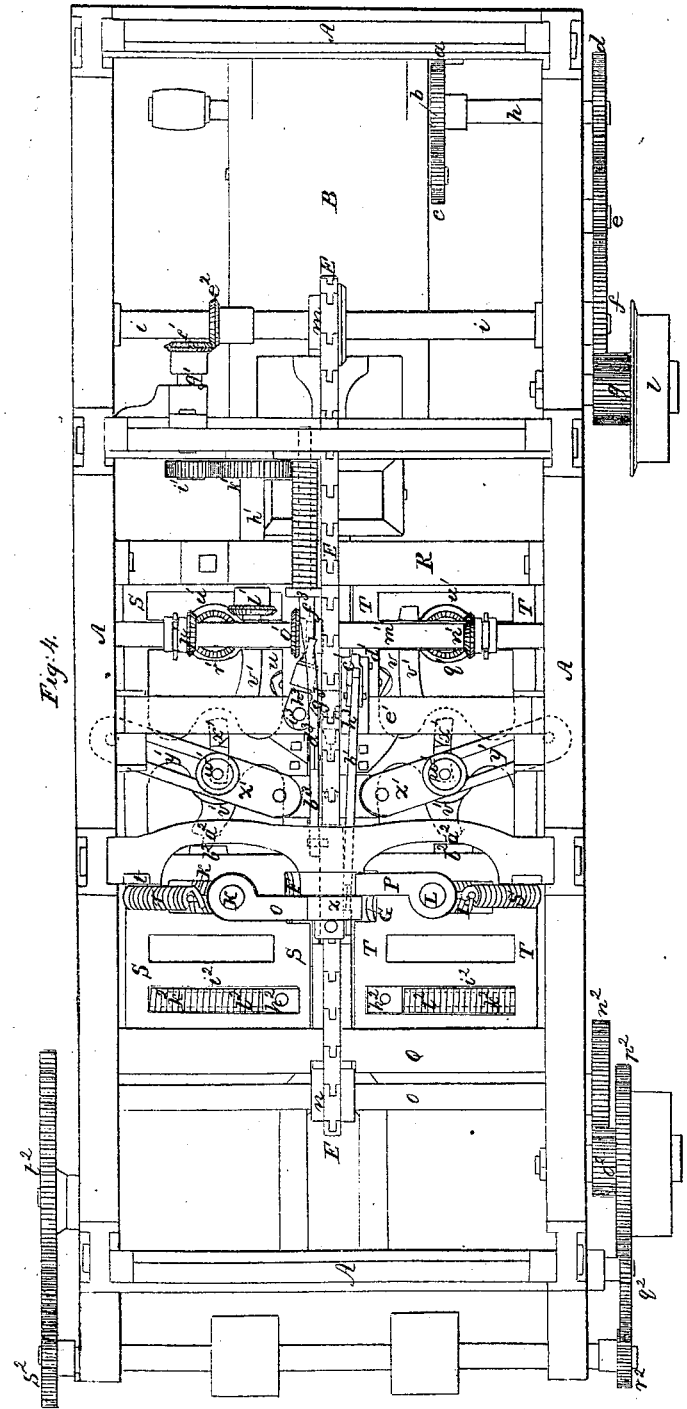

Of the said drawings, Figure 1 represents a top view of our said machine. Fig. 2 is a side elevation of it. Fig. 3 is a central, vertical, and longitudinal section of it. Fig. 4 is an underside view of it, or a view of it turned bottom side upward.

In the said drawings A represents the framework. This frame work supports a table or platform B over which is arranged a rotary cutting wheel C and pressure rollers D, D, the operation of which cutter wheel is to reduce the stave to the requisite thickness before it passes to the machinery by which it is dressed and jointed. The pressure rollers serve not only the purpose of holding the stave down upon the platform, but of advancing it or causing it to move under the cutter cylinder by which it is dressed or reduced to its proper thickness. These pressure rollers are rotated by a train of gears $a$, $b$, $c$, $d$, $e$, $f$, $g$, arranged as seen in Figs. 1, 2 and 3. The gears $b$ and $d$ being fixed upon a horizontal shaft $h$ while the gear $f$ is fixed upon another and longer horizontal shaft $i$ which rotates in bearings $k$, $k$. The pinion $g'$ is fixed upon the shaft of a driving pulley $l$, to which pulley motion is to be communicated in any proper manner.

E is an endless chain platform made to revolve on two sprocket wheels $m$, $n$, the former of which is placed on the horizontal shaft $i$, while the latter is placed on another and similar horizontal shaft $o$ arranged near the opposite end of the machine, as seen in the drawings. This endless chain plays between long horizontal guides or rails or a trough $p$, $p$, and has its outer periphery roughened or studded with points in such manner as to enable the chain to move a stave when such stave is made to rest and is pressed upon its upper surface and such chain is put in rotation. The rotary motion of the chain is effected by the rotary movement of either one or both of the shafts of its sprocket wheels. The stave is carried forward by and on this chain toward and between the cutter heads F, G by which the bilge and jointing of the stave is performed. These cutter heads are respectively rotated by means of belts made to pass around two pulleys H, I, affixed to such cutter heads and made to revolve on their shafts, which shafts respectively project inward from two vertical bars K, L, which are arranged as seen in the drawings and more particularly in Fig. 5 which is a transverse section of the machine taken through the cutter heads. These cutter heads or stocks are simply wheels having plane irons arranged on their inner surfaces. Between them and directly over the endless chain a large roller M is arranged, such roller being fixed on a horizontal shaft N and used for the purpose of holding the stave down on the chain while being operated on by the cutters of the cutter heads.

The object of our improvements is to enable the cutters or the cutter heads to adapt themselves to the formation of the bilge or curves of the edges of a stave as well as to joint the same, whatever may be the width of the stave submitted to them.

Having thus premised we shall now proceed to explain the mechanism by which we effect the object of our improvement.

The bars K L before mentioned as sustaining the axles of the cutter heads each rise upward from the outer end of one of two rocker bars O P that are arranged as seen in Fig. 5 and turn vertically on a common center. Springs $r$, $s$, are attached to outer ends of these rocker bars and to standards $t$, $t$, such springs being for the purpose of elevating the rocker bars and thus throwing the cutter heads upward toward one another whenever necessary. We would remark that the length of each rocker bar measuring from its center of motion to the axis of the upright bar which it bears should be the same as the distance between the plane of the cutting edges of the cutters of the cutter head directly over it and the axis of the bar sustained by said rocker bar. The distance from the center of motion of the rocker bars to the curve which the center of each cutter head describes during its lateral motion should be equal to the radius of the cask or barrel for which the staves are to be jointed.

Q, R are two transverse parallel rails which serve to support and guide two frames S, T, which are arranged on opposite sides of and about even with the top surface of the endless chain as seen in the drawings. Each of these frames is to be made capable of lateral motion in transverse directions, and is made to support and bear three or any other suitable number of horizontal rollers $u, u, u, v, v, v$, which are arranged with respect to each other and on their respective frames as seen in Fig. 1.

When the stave is drawn forward by the endless chain it passes between the two sets of such rollers and by its pressure against them and particularly those two rollers which are nearest together in the two sets it causes the frames on which said rollers are fastened to move outward in lateral directions. These frames being made to bear against the bars that sustain the axles of the cutter heads will move said bars outward with them and thereby carry the cutter heads asunder a distance that they are required to be before commencing their operation of reducing the edges of such stave. At this particular time the front end of the stave is made to move against the end of a movable bar $w$ that is placed by the side of the endless chain as seen in Fig. 1 and also in Fig. 6 which represents a longitudinal section of a part of the machine and a side view of the bar $w$ and the machinery which it operates, such machinery being for the purpose of clamping the frames S T, in position when the cutter heads are at their right distance apart for any stave.

By inspection of Fig. 6 it will be seen that the rear end of the bar $w$ is rounded a little and rises slightly above the upper surface of the endless chain and is jointed to the upper end of an upright rocker bar $x$ which vibrates on a pin $y$. The front end of the bar $u$ is jointed to the upper end of a lever $z$ that turns upon a fulcrum $a'$ and is jointed at its lower end to a long bar or connecting rod $b'$. The said bar $b'$ is jointed at its opposite end to the lower end of a bent clamping lever $c'$ which turns upon a stationary fulcrum $d'$ that projects from a cross bar $e'$ of the main frame. Each carriage or frame S T is to be provided with the clamping contrivance, although in the drawings it is exhibited as attached to one only. Thus it will be seen that while the stave is passing over the bar $w$ it so depresses said bar as to cause the clamping lever to rest or be brought down upon a projection of the frame S or T to which it is attached and with a sufficient degree of force to hold or clamp such frame in the desired position.

We next come to a description of the mechanism by which the bilge or curve of the side of the stave is formed, whatever may be the width of the stave, and we would premise that the wider the stave the greater will be the difference between its width at the middle and that at either end of it. On the horizontal shaft $i$ is a small bevel gear $e^2$ which works into and gives motion to another bevel gear $f'$ on a horizontal shaft $g''$ which stands at right angles to the first named shaft and parallel to another shaft $h'$ and is connected to the said shaft $h'$ by two spur gears $i'$ $k'$ or as seen in Fig. 4. On the inner end of the shaft $h'$ we place a bevel gear $l'$ so that it will be seen that such bevel gear is put in rotation whenever the shaft $i$ is put in revolution.

Figure 7:
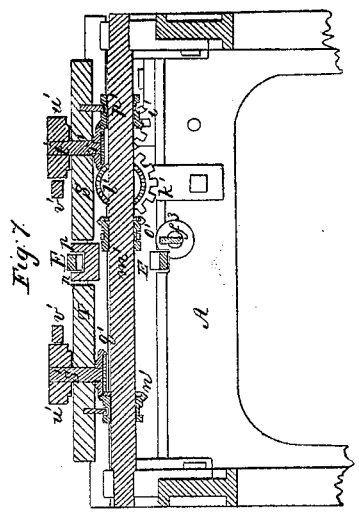

There is a transverse horizontal shaft $m'$ arranged directly under the carriages or frames S, T. On the said shaft are placed three bevel gears $n'$, $o'$, $p'$, which are so attached to the shaft as to slide freely on it in a longitudinal direction but not be capable of being turned independently of the shaft, such wheels being turned with and by the shaft when it is revolved. Each of the two outer wheels $n'$ $p'$ is so connected with the carriage T or S directly over it that when said carriage is moved laterally it will move the wheel to the same extent on the shaft of the wheel. Each of said bevel gears $n'$ $p'$ engages with one of two horizontal bevel gears $q'$ $r'$ which are fixed on the lower ends of two vertical shafts $s'$, $t'$, see Fig. 7 which denotes a vertical cross section of the carriages S, T. The said shafts $s'$ $t'$ respectively move in bearings attached to the carriages S, T, and each of said shafts has a cam $u'$ affixed upon its upper end which cam acts against the rear arm of a lever $v'$ as seen in Fig. 1. This lever turns upon a fulcrum or pin $u'$ that extends through it and through an elongated slot $x'$ made in the carriage S or T, and it also extends through another slot $y'$ made through a fixed or stationary plate $z'$. The position of each plate $z'$, there being one below each of the frames S, T, is shown in Fig. 1, one of the said plates is also seen in Fig. 2. Fig. 8 represents a top view of the two plates exhibiting their slots. The front end of the front arm of each of the levers $v'$ is made with a small tenon $a''$ which extends and slides freely into a mortise made in a projection $b''$ from the head or upper end of one of the bars K L as seen in the drawings. When the cams $u'$ revolve they of course so act upon the levers against which they revolve as to press the cutter heads outward so as to enable them to form the bilge of the stave from the front end toward the middle of it. Each cam also permits its cutter heads to move inward as may be required in order to form the curve or bilge of the stave which extends from the middle part of the stave toward the rear end of it, the inward movement of the cutter heads being produced by the springs $r$, $s$.

As it was said before that the wider the stave the greater the bilge or difference between its width at the middle and at the end of it, we have provided an additional machine by which this change in the form of the curve of the side is effected, the same being accomplished by means of each slot $x'$ and the slot $y'$ of the plate $z'$ arranged as hereinbefore described, the arrangement of these slots causing the fulcrum pin $w'$ and the lever thereof to move in a direction toward the cam of the lever whenever the carriage S or T is moved outward and in proportion to the movement of such carriage. Such a movement of the fulcrum tends to practically lengthen the short arm of the lever and shorten the long arm in such manner as to create a greater outward movement of such cutter head.

On each carriage S, T, and in front of each cutter head we arrange a plane stock $c''$ carrying a plane iron $d''$ arranged as seen in the drawings. This plane stock is held within a frame $e^3$ by means of centers $f''$, $f''$, which permit of a rocking or vibratory movement of the plane stock in a vertical plane extending transversely of the machine.

Fig. 9 is a transverse section taken through the plane stocks. In this section it will be seen that each frame or puppet that supports the plane stock $c''$ is made to rotate horizontally on a pin $g''$ which passes down through it and into a slide $h''$ that rests and moves in a long groove $i''$ made through the carriage S or T and is pressed forward by a spring $k''$ arranged in said slot and upon a rod $l''$ on which the slide moves.

From the above it will be seen that each plane iron is attached to its frame S or T by a universal joint as it were which enables it to readily adapt itself to the curved edge of a stave when said stave passes between the two plane stocks. The plane irons are simply smoothing plane irons and are for the purpose of smoothing off or down the edges of the stave after the bilge has been formed by the cutters of the cutter heads, and it will be seen by reference to Fig. 1 that the inner edge of each plane stock in rear of the plane iron is beveled or chamfered off a little as seen at $m''$ in order to allow the end of the stave to press the plane stocks outward or asunder to the extent which may be necessary to enable the planes to correctly operate upon the edges of the stave.

The shaft $o$ before mentioned as having the sprocket wheel $n$ upon it is rotated by a train of gears $n^2$ $o^2$ $p^2$ $q^2$ $r^2$ $s^2$ $t^2$ arranged as seen in the drawings, or it may be rotated by any other suitable means, the gear $t^2$ being put in motion by power applied to a crank $u''$ or in any other proper way. One or more pressure rollers $v''$ may be used to hold the staves down upon the endless chain if necessary.

Motion is communicated to the cams $u'$ $u'$ as follows: The stave in its movement passes over the end $a^3$ of the bent lever $b^3$ which turns on a fulcrum at $c^3$, the arm $d^3$ thereof being connected to a long spring rod $f^3$ which slides on proper bearings on the main frame. To the side of the rod a forked piece of metal $g^3$ is attached which engages with one of the arms of a right angled lever $h^3$ which turns on a fulcrum at $i$, the other arm of said lever being properly connected with the bevel pinion $o'$ which slides upon the shaft $m'$ longitudinally, and is thrown into gear with the bevel pinion $l'$ on the shaft $h'$. The connection of the pinion $o'$ with the pinion $l'$ gives motion to the shaft $m'$ and therefore to the pinions $n'$ $p'$ and $r'$ $q'$ and thereby to the cams $u'$ $u'$.

What we claim as of our invention is as follows:

1. In combination with each carriage or frame S, T, we claim the clamping contrivance or mechanism by which such carriage is held firmly in position after being moved outward by a stave, and while such stave is being reduced on its edges or has the bilge formed on it, such contrivance or mechanism consisting of the movable bar $w$, the rocker bar $x$, the lever $z$, connecting rod $b'$ and the clamping lever $c'$, the whole being applied to each carriage and made to act on it as specified.

2. And in combination with the lever $v'$ as applied and operated in the manner above set forth we claim the mechanism by which the fulcrum of the lever is caused to move longitudinally or toward the cam for the purpose of producing the effect equivalent to shortening the rear arm of the lever and lengthening the front arm thereof whereby the cutter head is made to depart farther from the middle of the machine so as to increase the curve of the bilge or make it as it were with a diminished radius, such mechanism being the stationary slotted plate underneath the carriage or frame S or T, as arranged and made to operate essentially as described.

3. And in combination with the cutters which produce the bilge curve, we claim the self adapting planes or plane irons arranged in front of such cutters and for the purpose of jointing or smoothing the edges of the bilge as explained.

In testimony whereof I have hereto set my signature, this twenty third day of February A. D. 1852.

DAVID ROOD.

Witnesses:
 FRANCIS GOULD,
 G. W. CUTLER.

In testimony whereof I, the said EDWIN JENNEY have hereto set my signature this eighth day of March A. D. 1852.

EDWIN JENNEY.

Witnesses:
 WILLIAM JENNEY,
 T. W. SNOOK.